United States Patent [19]
Cash et al.

[11] 3,721,738
[45] March 20, 1973

[54] TREATMENT AND PROPHYLAXIS OF THROMBOVASCULAR DISEASES WITH 2-IMIDAZOLONE DERIVATIVES

[75] Inventors: William D. Cash, Riverside, Conn.; Murray Weiner, White Plains, N.Y.

[73] Assignee: Ciba-Geigy Corporation, Ardsley, N.Y.

[22] Filed: May 14, 1971

[21] Appl. No.: 143,666

[52] U.S. Cl. ................................................ 424/273
[51] Int. Cl. .............................................. A61v 27/00
[58] Field of Search .................................. 424/273

[56] References Cited

UNITED STATES PATENTS 3,119,832    1/1964    Matter et al. ..................... 424/273

*Primary Examiner*—Stanley J. Friedman
*Attorney*—Karl F. Jorda

[57] ABSTRACT

A method for treating and preventing thrombovascular diseases in warm-blooded animals by administration of an effective amount of a 1,4-dialkyl-5-phenyl-2-imidazolone, such as for example, 1,4-dimethyl-5-phenyl-2-imidazolone.

2 Claims, No Drawings

TREATMENT AND PROPHYLAXIS OF THROMBOVASCULAR DISEASES WITH 2-IMIDAZOLONE DERIVATIVES

This invention relates to a process for treating and preventing thrombovascular diseases in warm-blooded animals, particularly mammals, by administering to them certain 1,4-dialkyl-5-phenyl-2-imidazolones in effective amounts.

More specifically, this invention is based on the discovery that 1,4-dimethyl-5-phenyl-2-imidazolones which can be represented by the following formula

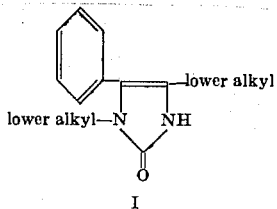

I are useful in the treatment and prophylaxis of thrombovascular diseases, in particular atherosclerosis and strokes.

The term "lower alkyl" as used herein means saturated monovalent aliphatic radicals of the formula — $C_mH_{2m+1}$ wherein $m$ designates an integer of less than 4 and is inclusive of both straight chain and branched chain radicals, e.g., methyl, ethyl, propyl, isopropyl, butyl, isobutyl and tert. butyl. The term "thrombovascular diseases" as used herein refers to atherosclerosis, deep venous thrombosis, arterial thrombosis, pulmonary embolism, angina pectoris, endotoxin shock, strokes, thrombophlebitis, thrombotic sepsis, thrombocytopenic coagulopathy and thrombo-embolic problems arising from cardiac valve replacement and prosthetic vascular implants.

The 2-imidazolones of the present invention can be synthesized directly by cyclization of the urea obtained by condensation of a suitable aminophenone and a suitable isocyanate in accordance with the following equation

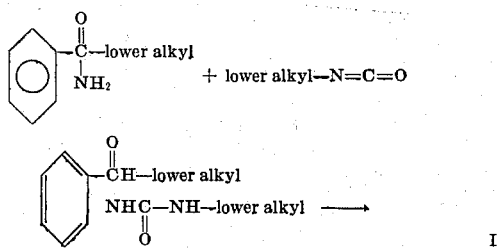

I

This condensation and cyclization is readily accomplished through simple admixture of the two reagents, optionally in a solvent such as anhydrous pyridine. Mild heating; e.g., refluxing, after the initial reaction period, generally improves yields. Upon completion of this reaction and removal of any solvent, as through evaporation, the resulting product can be obtained and purified via conventional methods such as crystallization, chromatography, sublimation or the like.

The aminophenones used as starting materials are prepared by conventional methods, e.g., by reduction of the α-hydroiminoketone or appropriate substitution of the α-bromo-ketone as illustrated in greater detail below.

The method for the preparation of these compounds can be exemplified more fully by the following illustrative examples in which the temperatures are given in degrees Centigrade.

The starting material α-aminopropiophenone hydrochloride was prepared as described by L. Behr-Bregowski, Ber. 30, 1521 (1897). 1-Phenyl-1,2-propanedione-2-oxime (0.20 mole, 33 g) was added to a solution of stannous chloride (90 g) in concentrated hydrochloric acid (130 ml). The reaction mixture was stirred at room temperature for 1 hour; the exothermic reaction was controlled so that the temperature did not exceed 60°. The suspension was cooled, the crystalline solid was filtered off and washed with concentrated hydrochloric acid. The wet solid was redissolved in water, $H_2S$ gas was introduced until no more sulfide precipitated, the suspension was filtered and the filtrate was evaporated to dryness. The product was crystallized by the addition of isopropanol, and the suspension was re-evaporated to dryness to give desired product (16.5 g, m.p. 178°–81°). α-Aminopropiophenone hydrochloride (0.096 mole, 17.8 g) was added to a solution of methyl isocyanate (0.096 mole, 5.48 g) in anhydrous pyridine (135 ml). The mixture was stirred at room temperature for 1 hour and then heated at 80° for 1 hour. The solution was evaporated to dryness, water (100 ml) was added, the pH was adjusted to 8.5 with saturated $Na_2CO_3$ solution, and the aqueous solution was extracted with chloroform (3 × 200 ml). The chloroform solution was washed with water, dried over $Na_2SO_4$ and evaporated to dryness. The residue was crystallized from ethyl acetate (50 ml) to give desired compound (13.3 g, m.p. 169°–71°). One additional recrystallization from ethyl acetate gave analytically pure sample (12.1 g, m.p. 170°–2°) of 1,4-dimethyl-5-phenyl-2-imidazolone. Analysis for $C_{11}H_{12}N_2O$ Calc'd.: C, 70.17; H, 6.43; N, 14.88

Found : C, 69.92; H, 6.55; N, 14.58

α-Aminopropiophenone hydrochloride (18.6 g; 0.1 mole) was added under nitrogen to a solution of butyl isocyanate (9.9 g; 0.1 mole) in pyridine (50 ml) at room temperature. (A mild exothermic reaction was observed). The reaction mixture was heated at 80° for 2 hours, under $N_2$. The hot reaction mixture was filtered and the yellow filtrate was poured into 700 ml of water. The oil which initially separates, crystallized within a few minutes. The crystalline product was collected and washed with water (3 × 20 cc) to yield 1-(n-butyl)-4-methyl-5-phenyl-2-imidazolone as crude product (20.1 g), m.p. 63°–88°.

The crude product was dissolved in 300 cc of hot hexane, filtered through a bed of anhydrous sodium sulfate, and allowed to crystallize spontaneously to yield pure product (13.4 g; 58 percent of theory), m.p. 97.9°, as colorless needles.

Analysis for $C_{14}H_{18}N_2O$

Calc'd.: C, 73.01; H, 7.88; N, 12.17

Found : C, 72.77; H, 8.12; N, 12.02

As indicated above, the 2-imidazolones described hereinabove can be employed as therapeutic agents to treat or prevent thrombovascular diseases. These compounds have previously been found to be useful as anti-inflammatory agents for the treatment in mammals of a variety of inflammatory conditions such as dermatitis, inflammation of joints and similar conditions.

The reasons for the effectiveness of these compounds against thrombovascular diseases are not fully understood but it appears that the mechanism of platelet stabilization is involved. Abnormal platelet function has been implicated in an increasing number of thrombovascular diseases and resultant secondary disorders. Furthermore there is considerable evidence of the successful management of some of these disorders by treatment with drugs that inhibit platelet aggregation or the platelet release reaction. Two prominent examples of such drugs are dipyridamole and sulfinpyrazone.

Experimental studies regarding the role of platelets in thrombus formation have shown that in the initiation of thrombi the interaction of platelets with surfaces is important. In the vessel wall the principal factor is collagen. However, prosthetic materials such as those used in vascular surgery also have an effect upon platelets. This effect is enhanced if the surfaces become coated with plasma protein. In addition, platelets will interact with antigen-antibody complexes and with particles coated with gammaglobulin. Further, endotoxin interacts with platelets and produces platelet aggregates. One of the major problems of bacterial endotoxin is endotoxin shock. It has been shown that the administration of sulfinpyrazone at doses sufficient to interfere with the platelet-surface reaction prevents endotoxin-induced platelet aggregation and the corresponding shock-like stage.

Studies have shown that sulfinpyrazone, when administered in man at a dose of 200 mg 4 times per day, orally, interferes with the platelet collagen reaction, interferes with platelet glass adhesiveness, increases platelet survival and decreases platelet turnover. An additional in vivo effect has been cited above in reference to endotoxin shock.

Combined dipyridamole and anticoagulant therapy reduces the incidence of thromboembolic complications after cardiac valve replacement. Dipyridamole and aspirin prolonged platelet survival in patients with arteriovenous cannulae inserted for use in hemodialysis; in cannulated baboons these agents in combination corrected platelet survival and prolonged the duration of cannula patency. Therapy with 800 mg of sulfinpyrazone per day corrected platelet abnormalities in patients with prosthetic mitral valves, suggesting the utility of this agent in the prevention of thromboembolism in such patients.

Platelet involvement and emboli formation then are common features of thrombovascular diseases. The blood from patients with e.g., atherosclerosis shows platelet abnormalities such as increased adhesiveness, shorter survival, and increased turnover. Emboli from various sources, such as atrial myxoma and cardiac valve replacement are considered to give rise to recurrent neurological dysfunction and eventually stroke. It was recently found that sulfinpyrazone, at doses sufficient to suppress platelet aggregation to collagen stimulus, reduced mortality in a group of high-risk, elderly male patients.

It has now been found that e.g., 1,4-dimethyl-5-phenyl-2-imidazolone influenced membrane properties of lysosomes and red blood cells and strongly inhibited collagen-induced and ADP-induced platelet aggregation in experiments with both human and pig platelets. It also enhanced deaggregation of platelets that had aggregated in response to an ADP stimulus. Further, it causes slight inhibition of thrombin-induced aggregation of pig platelets. These results indicate that it differs from phenylbutazone, sulfinpyrazone, and aspirin in that it inhibits both collagen- and ADP-induced aggregation, whereas the other three agents do not inhibit the latter type of aggregation.

In a study using guinea pig adipose tissue as the enzyme source, it was further found that this compound inhibited phosphodiesterase in vitro, it potency being somewhat higher than that of theophylline, a standard phosphodiesterase inhibitor. The ability of this compound to inhibit phosphodiesterase in vivo was tested by measuring its effect upon plasma free fatty acids; theophylline and other phosphodiesterase inhibitors are known to elevate plasma free fatty acids. At a dose of 100 mg/kg orally in rats this compound caused a marked elevation in plasma free fatty acids and in plasma glycerol. Thus, there is evidence that this compound influences cyclic AMP levels in vivo in a way that favors prevention of platelet aggregation.

It was then in fact found that at concentrations of less than $1 \times 10^{-4}$ M this compound prevented platelet aggregation. A $1 \times 10^{-4}$ molar concentration would be equivalent to 18.8 $\mu$g per ml. a concentration that can be achieved in plasma of various species with well-tolerated doses.

Thus, in view of the dual effect of this compound, i.e., prevention of collagen- and ADP-induced platelet aggregation, this compound is highly useful in the treatment or prophylaxis of various thrombovascular diseases.

The therapeutic agents for the treatment of thrombovascular diseases of this invention can be administered by any of the conventional means available for use in conjunction with pharmaceuticals. Pharmaceutical composition in dosage unit form comprise about 10 mg. to about 500 mg. of the active ingredient.

To produce dosage units for peroral application, the active substances of general formula 1 or a salt thereof is combined, e.g., with solid powdered carriers such as lactose, sucrose, sorbitol, mannitol; starches such as potato starch, corn starch or amylopectin, also laminaria powder or citrus pulp powder; cellulose derivatives or gelatin, also lubricants such as magnesium or calcium stearate or polyethylene glycols (Carbowaxes) of suitable molecular weights may be added, to form compressed tablets or core tablets for sugar coating. The latter are coated, for example, with concentrated sugar solutions which e.g., can contain gum arabic, talcum and/or titanium dioxide, or they are coated with a lacquer dissolved in easily volatile organic solvents or mixtures of organic solvents. Dyestuffs can be added to these coatings, for example, to distinguish between different contents of active substance. Soft gelatin capsules (pearl-shaped closed capsules) and other capsules consist for example of a mixture of gelatin and glycerin and contain, e.g., mixtures of the active substance or a suitable salt thereof with Carbowax and hard gelatin capsules contain, for example, granulates or powder blends of the active substance or a suitable salt thereof with solid, powdered carriers such as, e.g., lactose, sucrose, sorbitol, mannitol; starches such as potato starch, corn starch or amylopectin, cellulose derivatives or gelatin, as well as magnesium stearate or stearic acid. Suppositories are employed as dosage units for rectal application. These consist of a combination of the active substance or a suitable salt thereof with a neutral fatty base, or also gelatin rectal capsules can be employed which consist of a combination of the active substances with polyethylene glycols (Carbowaxes) of suitable molecular weight.

Ampuls for parenteral, particularly intramuscular administration preferably contain a water soluble salt of the active substance of formula 1 and suitable stabilizing agents and, if necessary, buffer substances in aqueous solution. Anti-oxidizing agents such as sodium bisulfite, sodium sulfite, ascorbic acid or Rongalit (formaldehydesodium bisulfite compound) are suitable as stabilizing agents either alone or combined, in total concentrations between about 0.01 and about 0.5 per cent. Because of its ability to form chelates, ascorbic acid has an additional stabilizing effect; in this function it can also be replaced by other chelate-formers. The best stability of the active ingredient is attained, e.g., by mixtures in suitable ratio of sodium sulfite, sodium bisulfite and/or ascorbic acid, or by the addition of other buffer substances such as citric acid and/or salts thereof. In addition, the ampuls can contain a slight amount of a usual preservative.

Useful pharmaceutical formulations for administration of the compounds of this invention may be illustrated as follows:

Capsules
    Active Ingredient    10 mg.–500 mg.
    Lactose    20 mg.–100 mg.
    Corn Starch, U.S.P.    20 mg.–100 mg.
    Aerosolized Silica Gel    2 mg.–4 mg.
    Magnesium Stearate    1 mg.–2 mg.
Tablets
    Active Ingredient    100 mg.
    Microcrystalline Cellulose    50 mg.
    Corn Starch, U.S.P.    80 mg.
    Lactose, U.S.P.    50 mg.
    Magnesium Stearate, U.S.P.    2 mg.

This tablet can also be sugar coated according to the usual art practices. Colors may be added to the coating.

Chewable Tablets
    Active Ingredient    100 mg.
    Mannitol, N.F.    100 mg.
    Flavor    1 mg.
    Magnesium Stearate, U.S.P.    2 mg.
Suppositories
    Active Ingredient    100 mg.
    Suppository Base    1900 mg.
Liquid
    Active Ingredient    2.0%
    Polyethylene Glycol 300, N.F.    10.0%
    Glycerin    5.0%
    Sodium Bisulfite    0.2%
    Sorbitol Solution 70% U.S.P.    50.0%
    Methylparaben, U.S.P.    0.1%
    Propylparaben, U.S.P.    0.02%
    Distilled water, U.S.P. qs.    100.0 cc
Injectable
    Active Ingredient    25.0 mg.
    Polyethylene Glycol 600    1.0 cc.
    Sodium Bisulfite, U.S.P.    0.4 mg.
    Water for Injection, U.S.P. qs.    2.0 cc.

According to the above disclosure, the invention thus pertains to a process which comprises administering to warm-blooded animals suffering from or predisposed to thrombovascular diseases an effective amount of a 2-imidazolone compound of the formula I by way of a pharmaceutical composition comprising a pharmaceutical carrier and from about 10 mg. to about 500 mg. of, for example, 1,4-dimethyl-5-phenyl-2-imidazolone.

The amount of these compounds which is administered in use to effect a therapeutic response must in all cases be adjusted to the mammal being treated, its age, weight and condition, as well as the degree of response required. Thus while a therapeutic response is observed in the range of about 0.1 mg/kg to about 300 mg/kg, preferably about 1 mg/kg to about 100 mg/kg, the actual dose should be carefully titrated to the particular subject in accordance with well-recognized principles of pharmacology.

What is claimed is:

1. A process which comprises administering to a warm-blooded animal suffering from atherosclerosis an effective amount of a 2-imidazolone compound of the formula

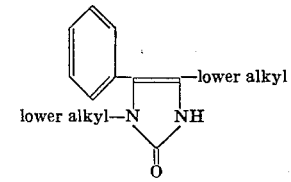

2. A process according to claim 1 in which the compound is 1,4-dimethyl-5-phenyl-2-imidazolone.

* * * * *